US011078335B2

(12) United States Patent
Swier et al.

(10) Patent No.: US 11,078,335 B2
(45) Date of Patent: Aug. 3, 2021

(54) METHOD FOR PREPARING A GRAFT COPOLYMER WITH A POLYOLEFIN BACKBONE AND POLYORGANOSILOXANE PENDANT GROUPS

(71) Applicant: Dow Silicones Corporation, Midland, MI (US)

(72) Inventors: Steven Swier, Midland, MI (US); Zachary Kean, Bay City, MI (US); John B. Horstman, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 60 days.

(21) Appl. No.: 16/621,745

(22) PCT Filed: Jul. 18, 2018

(86) PCT No.: PCT/US2018/042588
§ 371 (c)(1),
(2) Date: Dec. 12, 2019

(87) PCT Pub. No.: WO2019/023008
PCT Pub. Date: Jan. 31, 2019

(65) Prior Publication Data
US 2020/0157286 A1 May 21, 2020

Related U.S. Application Data

(60) Provisional application No. 62/536,635, filed on Jul. 25, 2017.

(51) Int. Cl.
*C08G 77/442* (2006.01)
*C08G 77/08* (2006.01)
*C08L 83/10* (2006.01)
*C08L 43/04* (2006.01)

(52) U.S. Cl.
CPC .......... *C08G 77/442* (2013.01); *C08G 77/08* (2013.01); *C08L 43/04* (2013.01); *C08L 83/10* (2013.01)

(58) Field of Classification Search
CPC .......................... C08F 299/08; C08G 77/442
USPC ................................................ 525/105, 106
See application file for complete search history.

(56) References Cited

U.S. PATENT DOCUMENTS

| | | |
|---|---|---|
| 3,159,601 A | 12/1964 | Ashby |
| 3,175,993 A | 3/1965 | Weyenberg |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,660,443 A | 5/1972 | Boissieras et al. |
| 3,663,649 A | 5/1972 | Wheeler, Jr. |
| 3,691,257 A | 9/1972 | Kendrick et al. |
| 3,814,730 A | 6/1974 | Karstedt |
| 3,989,668 A | 11/1976 | Lee et al. |
| 4,370,358 A | 1/1983 | Hayes et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,707,531 A | 11/1987 | Shirahata |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,310,843 A | 5/1994 | Morita |
| 5,654,356 A | 8/1997 | Namiki et al. |
| 5,744,541 A | 4/1998 | Sawaguchi et al. |
| 5,910,547 A | 6/1999 | Schwindeman et al. |
| 6,084,030 A | 7/2000 | Janssen et al. |
| 6,127,502 A | 10/2000 | Krahnke et al. |
| 6,175,031 B1 | 1/2001 | Tachikawa |
| 6,265,518 B1 | 7/2001 | Krahnke et al. |
| 6,624,254 B1 | 9/2003 | Arriola et al. |
| 6,753,438 B2 | 6/2004 | Taylor et al. |
| 7,064,173 B2 | 6/2006 | Rubinsztajn et al. |
| 7,087,686 B2 | 8/2006 | Britovsek et al. |
| 7,148,370 B1 | 12/2006 | Rubinsztajn et al. |
| 7,355,089 B2 | 4/2008 | Chang et al. |
| 8,017,693 B2 | 9/2011 | Makio et al. |
| 8,088,869 B2 | 1/2012 | Joseph et al. |
| 8,426,519 B2 | 4/2013 | Cogen et al. |
| 8,476,375 B2 | 7/2013 | Backer et al. |
| 8,501,894 B2 | 8/2013 | Crowther et al. |
| 8,569,417 B2 | 10/2013 | Backer et al. |

(Continued)

FOREIGN PATENT DOCUMENTS

| | | |
|---|---|---|
| EP | 0347895 | 12/1989 |
| EP | 1907495 | 4/2008 |
| GB | 1093904 | 12/1967 |
| JP | 03015444 | 3/2000 |

(Continued)

OTHER PUBLICATIONS

Bulsari et al., Hydrosilylation of impact polypropylene co-polymer in a twin-screw extruder. Journal of Elastomers & Plastics vol. 40 Issue4 pp. 365-380, 2008.

(Continued)

*Primary Examiner* — Marc S Zimmer
(74) *Attorney, Agent, or Firm* — Catherine U. Brown

(57) ABSTRACT

A method for preparing a graft copolymer having a polyolefin backbone and polyorganosiloxane pendant groups can be catalyzed by a Lewis Acid catalyst, Piers-Rubensztjan catalyst, or hydrosilylation reaction catalyst. The graft copolymer prepared by the method is useful as a thermoplastic elastomer or as a compatibilizer in compositions containing both a polyolefin and a polyorganosiloxane.

13 Claims, No Drawings

(56) References Cited

U.S. PATENT DOCUMENTS

| | | | |
|---|---|---|---|
| 8,835,548 | B2 | 9/2014 | Esseghir et al. |
| 8,859,709 | B2 | 10/2014 | Katsoulis et al. |
| 9,181,379 | B2 | 11/2015 | Backer et al. |
| 9,237,865 | B2 | 1/2016 | Wang et al. |
| 9,273,163 | B2 | 3/2016 | Crowther et al. |
| 9,388,265 | B2 | 7/2016 | Burns et al. |
| 9,441,079 | B2 | 9/2016 | Yang et al. |
| 9,493,615 | B2 | 11/2016 | Backer et al. |
| 9,862,867 | B2 | 1/2018 | Gordon et al. |
| 2006/0155090 | A1 | 7/2006 | Ferenz |
| 2009/0156776 | A1 | 6/2009 | Rubinsztajn et al. |
| 2010/0181092 | A1 | 7/2010 | Cree et al. |
| 2010/0209705 | A1 | 8/2010 | Lin et al. |
| 2011/0136979 | A1* | 6/2011 | Cogen ............... C08L 23/00 525/106 |
| 2011/0172367 | A1 | 7/2011 | Backer et al. |
| 2012/0178867 | A1 | 7/2012 | Esseghir et al. |
| 2012/0283362 | A1* | 11/2012 | Backer ............... C08L 23/04 524/13 |
| 2012/0283388 | A1 | 11/2012 | Backer et al. |
| 2014/0161858 | A1 | 6/2014 | Mays et al. |
| 2015/0376482 | A1 | 12/2015 | Bekemeier et al. |
| 2016/0200909 | A1 | 7/2016 | Chang et al. |
| 2016/0376482 | A1 | 12/2016 | Morgeneyer et al. |
| 2017/0022223 | A1* | 1/2017 | Nakanishi ............ C09C 1/3081 |
| 2017/0133121 | A1 | 5/2017 | Yu et al. |
| 2020/0407512 | A1* | 12/2020 | Swier ............... C08F 8/42 |

FOREIGN PATENT DOCUMENTS

| | | |
|---|---|---|
| WO | 9747665 | 12/1997 |
| WO | 9833842 | 8/1998 |
| WO | 20020081551 | 10/2002 |
| WO | 2003093349 | 11/2003 |
| WO | 2003093369 | 11/2003 |
| WO | 2007008765 | 1/2007 |
| WO | 2011032172 | 3/2011 |
| WO | 2011083047 | 7/2011 |
| WO | 2012103080 | 8/2012 |
| WO | 2015000851 | 1/2015 |
| WO | 2015017068 | 2/2015 |
| WO | 2017091720 | 6/2017 |
| WO | WO 2019/068357 | * 4/2019 |

OTHER PUBLICATIONS

Ciolino, A. E., et al. (2004). "Synthesis of polybutadiene-graft-poly(dimethylsiloxane) and polyethylene-graft-poly (dimethylsiloxane) copolymers with hydrosilylation reactions." Journal of Polymer Science Part A: Polymer Chemistry 42(12): 2920-2930.
Coughlin et co. Macromolecules 2001; 34:8034.
Dziubek, K et co. J Therm Anal Calorim 2016; 125: 1287.
Long et al. Surface characteristics of hydro silylated polypropylene. Journal of Applied Polymer Science. vol. 88, Issue14, pp. 3117-3131 2003.
Macromolecules 2005, 38:1061. "A New polycondensation process for the preparation of polysiloxane copolymers".
Macromolecules, 2003, 36 (2), pp. 368-372.
Malz, H. et al., Hydrosilylation of terminal Double Bonds. Polymer Engineering and Science, Dec. 1998, vol. 38, No. 12. p. 1976-1984.
Sam, J et al. Dow Corning. J. Am. Chem. Soc. (1961) 83(6) 1351.
Sarkar, B et co.; Nanomaterials 2012; 2: 445.
Shearer et al., Free radical hydrosilylation of polypropylene. Journal of Applied Polymer Science. vol. 65, Issue3, 439-447 (1997).
Tolinski, M.; Additives for Polyolefins 2015, chapter 7, p. 71.
Uozumi, T., et al. (2000). "Synthesis of functionalized alternating olefin copolymer and modification to graft copolymer by hydrosilylation." Journal of Polymer Science Part A: Polymer Chemistry 38(10): 1844-1847.
Waddon, A.J. et co. Nano Letters 2002; 10:1149.
Graiver., Graft and block copolymers with polysiloxane and vinyl polymersegments. Silicon Chemistry. 2002, p. 107-120, vol. 1, No. 2. Norwell, Maine.
Inoue, et al. Reactions of Organozinc Coordination Compounds. Journal of Organometallic Chemistry, p. 11-16.
Louis., "Karstedt Catalyst-Catalyzed stepgrowthh co-polyaddition of 1, 9-decadiene and 1, 1, 3, 3,-tetramethyldisiloxane." Journal of Organometallic Chemistry. 2006, p. 2031-2036, vol. 691, No. 9. Elsevier, Amsterdam.
Rudin., "Modern Methods of Polymer Characterization." John Wiley & Sons. 1991, p. 103-112, New York.
"Silicones", Apr. 15, 2003 (Apr. 15, 2003), Encyclopedia of Polymer Science and Techno, Wiley, US, pp. 765-841, XP007918236, pp. 801-805.
Waddon., "Crystal Structure of Polyhedral OligomericSilsequioxane (POSS) Nano-materials: A Study by X-rayDiffraction and Electron Microscopy." 2003, p. 4555-4561, vol. 15.
Zhang, H X, Et al, "Prepareation and properties of propylene/POSS copolymer with rac-Et (Ind) 2ZrXI2 catalyst", European Polymer Journal, Pergamon Press Ltd. Oxford, GB, vol. 45, No. 1, Jan. 1, 2009 (Jan. 1, 2009), pp. 40-46, XP025869132.
Zheng, et al.; Novel Polyolefin Nanocomposites; Macromolecules 2001; 34, 8034-8039.
Zhou, et al., "Palladium-Catalyzed Negishi Cross-Coupling Reactions of Unactivated Alkyl Iodides, Bromides, Chlorides, and Tosylates"; J. AM, Chem, Soc., vol. 125, No. 41, 2003, pp. 12627-12630.

* cited by examiner

METHOD FOR PREPARING A GRAFT COPOLYMER WITH A POLYOLEFIN BACKBONE AND POLYORGANOSILOXANE PENDANT GROUPS

CROSS REFERENCE TO RELATED APPLICATIONS

This application is a U.S. national stage filing under 35 U.S.C. § 371 of PCT Application No. PCT/US18/042588 filed on 18 Jul. 2018, which claims the benefit of U.S. Provisional Patent Application No. 62/536,635 filed 25 Jul. 2017 under 35 U.S.C. § 119 (e). PCT Application No. PCT/US18/042588 and U.S. Provisional Patent Application No. 62/536,635 are hereby incorporated by reference.

TECHNICAL FIELD

This invention relates to a method for preparing a graft copolymer having a polyolefin main chain (backbone) and a polyorganosiloxane pendant group. More particularly, the method described herein provide control in number of graft segments and the ability to keep the polyolefin main chain intact.

BACKGROUND

Methods for preparing graft copolymers having polyolefin backbones with polyorganosiloxane groups have been proposed, however, methods including radical polymerizations (e.g., employing peroxides, maleic acid, or anhydride) may result in degradation of the polyolefin backbone. There is an industry need to provide more robust methods for preparing graft copolymers without degradation of the polyolefin backbone and/or with controlled numbers of grafted segments.

SUMMARY

A method for preparing a graft copolymer having a polyolefin backbone and polyorganosiloxane pendant groups may be performed using different catalysts.

DETAILED DESCRIPTION

The graft copolymer having a polyolefin backbone and polyorganosiloxane pendant groups be prepared by a method comprising:
1) combining starting materials comprising
   A) a silane grafted polyolefin having, per molecule, at least one silicon bonded reactive substituent,
   B) a polyorganosiloxane having, per molecule, at least one silicon bonded reactive substituent,
   C) a catalyst for reacting the reactive substituent of starting material A) and the reactive substituent for starting material B), and
   D) a solvent;
optionally, 2) capping a residual reactive substituent after step 1); and optionally, 3) recovering the graft copolymer from a reaction product prepared by step 1) or, when present, step 2). The method may optionally further comprise forming A) the silane-grafted polyolefin having, per molecule, at least one silicon bonded reactive substituent, by a method comprising grafting a silane moiety onto a polyolefin by metallocene catalysis before step 1), and/or the method may optionally further comprise forming B) the polyorganosiloxane having, per molecule, at least one silicon bonded reactive substituent, by a method comprising reacting an alkoxysilane having at least one aliphatically unsaturated hydrocarbon group of 2 to 18 carbon atoms with a SiH functional polyorganosiloxane by hydrosilylation catalysis before step 1).

In step 1), A) the silane grafted polyolefin may have a saturated polyolefin backbone (optionally with aliphatically unsaturated endblocking groups). The silane grafted polyolefin (and optionally all other starting materials used in step 1) may be free of (meth)acrylate functional groups. "Free of (meth)acrylate functional groups" means containing no acrylate or methacrylate functionality or an amount of acrylate and/or methacrylate functionality non-detectable by IR analysis. The polyolefin used to prepare A) may be a homopolymer or a copolymer of different monomers. The polyolefin used to prepare starting material A) may be, for example, a polyethylene, a poly(ethylene/octene) copolymer, a polypropylene, or a polystyrene. Alternatively, the polyolefin may be a polyethylene or a polypropylene. Alternatively, the polyolefin may be a polyethylene or a poly(ethylene/octene) copolymer. Starting material C) the catalyst may be a Lewis Acid catalyst or a hydrosilylation reaction catalyst. Radical polymerization catalysts (such as peroxides, anhydrides, and maleic acids) are generally avoided to prevent degradation of the polyolefin. Step 1) may be performed by any convenient means, such as heating and/or mixing. Heating may be performed at a temperature of 50° C. to 150° C., alternatively 80° C. to 110° C. Mixing may be performed by any convenient means, in either batch or continuous equipment. Step 1) may be performed in solution, i.e., starting materials comprising A), B), and C) may be dissolved in starting material D), the solvent.

Step 2) may be performed, for example, when the graft copolymer has a siloxane pendant group with a silicon bonded substituent such as OH, H, OR, and/or an epoxyfunctional organic group, where each R is independently a monovalent hydrocarbon group of 1 to 18 carbon atoms or a monovalent halogenated hydrocarbon group of 1 to 18 carbon atoms. To prevent these substituents on the siloxane pendant groups in the copolymer from further reacting, these may be capped with a suitable capping agent. The capping agent may be a silane with one substituent capable of reacting with the OH, H, OR, or epoxy functionality. The capping agent may have formula: $R_3SiR^{14}$, where $R^{14}$ is a substituent capable of reaction with one or more of OH, H, OR, or epoxy functionality, such as H or hydrocarbyloxy (e.g., alkoxy). For example, when the polyorganosiloxane has two or more silicon bonded OR groups, an organohydridosilane capping agent may be added in step 2), with heating to temperatures of 50° C. to 200° C., alternatively 100° C. to 120° C. The organohydridosilane may have formula $R_3SiH$, where each R is independently a monovalent hydrocarbon group of 1 to 18 carbon atoms or a monovalent halogenated hydrocarbon group of 1 to 18 carbon atoms. Suitable monovalent hydrocarbon groups for R include alkyl, alkenyl, and aryl, as defined herein. Alternatively, each R may be independently selected from the group consisting of methyl, vinyl, allyl, and phenyl; alternatively each R may be independently selected from the group consisting of methyl and phenyl. R is as defined above. Alternatively, the capping agent may have formula $R_3SiOR$, where R is as defined above when the polyorganosiloxane has two or more silicon bonded OR groups.

Step 3) may be performed by any convenient means such as solvent extraction, precipitation and filtering, or stripping and/or distillation optionally at reduced pressure.

In one embodiment of the method described above, A) the silane grafted polyolefin may comprise units of formulae

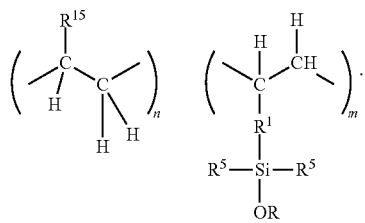

Each R is independently a monovalent hydrocarbon group of 1 to 18 carbon atoms or a monovalent halogenated hydrocarbon group of 1 to 18 carbon atoms. Suitable monovalent hydrocarbon groups for R include alkyl, alkenyl, and aryl, as defined herein. Alternatively, each R may be independently selected from the group consisting of methyl, vinyl, allyl, and phenyl; alternatively each R may be independently selected from the group consisting of methyl and phenyl.

Each $R^5$ is independently selected from R or OR, where R is as described above. Alternatively, each $R^5$ is a monovalent hydrocarbon group of 1 to 18 carbon atoms or a monovalent halogenated hydrocarbon group of 1 to 18 carbon atoms as described above for R.

Each $R^1$ is independently a divalent hydrocarbon group of 2 to 50 carbon atoms. Suitable divalent hydrocarbon groups for $R^1$ are exemplified by an alkylene group such as ethylene, propylene, butylene, hexylene, or octylene; an arylene group such as phenylene, or an alkylarylene group such as:

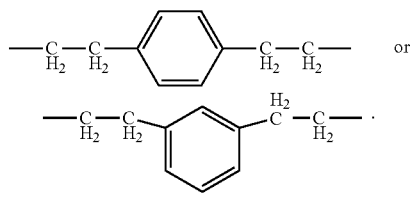

Alternatively, each $R^1$ is an alkylene group such as octylene.

Each $R^{15}$ is independently H, a monovalent hydrocarbon group of 1 to 18 carbon atoms or a monovalent halogenated hydrocarbon group of 1 to 18 carbon atoms, as described herein for R. Alternatively, each $R^{15}$ may be H or an alkyl group of 1 to 6 carbon atoms. Alternatively, each $R^{15}$ may be H.

Subscript m is at least 1. Subscript n is at least 1. Alternatively, $1 \leq m \leq 10$ and $10 \leq n \leq 20,000$. Alternatively, subscripts m and n may have values such that a quantity m/(m+n) may have a value such that $0.01$ mol $\% \leq m/(m+n) \leq 10$ mol %. Alternatively, subscripts m and n may have values sufficient to provide the copolymer with a Mn of 1,000 to 500,000.

This silane grafted polyolefin may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

Such silane grafted polyolefins are commercially available, for example, polyethylene grafted with silicon bonded methoxy groups, which is commercially available as SI-LINK™ DFDA from The Dow Chemical Company of Midland Mich., U.S.A. Examples include SI-LINK™ DFDA 6451 NT, SI-LINK™ DFDA 5480, SI-LINK™ DFDA 5480 NT, SI-LINK™ DFDA 5451 NT, and combinations thereof. Examples of such silane grafted polyolefins and methods for their preparation are disclosed, for example in U.S. Patent Application Publications 2010/0181092 and 2010/0209705, and U.S. Pat. No. 8,426,519.

In this embodiment, B) the polyorganosiloxane may have formula

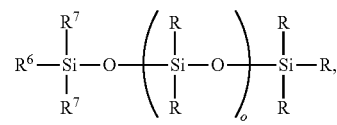

where R is as described above; $R^6$ is selected from H, OR, or OH or a silyl moiety of formula $—R^1—SiR_a(OR)_b$, where subscript a is 0 to 2, subscript b is 1 to 3, and a quantity (a+b)=3, where $R^1$ is as described above; and each $R^7$ is independently selected from R and $R^6$. Subscript o is 5 to 500, alternatively 10 to 500. Alternatively subscript o may be 15 to 400. Alternatively, subscript o may be 20 to 300. Alternatively, subscript o may be 25 to 200. Alternatively, subscript o may be 50 to 150. Suitable polyorganosiloxanes and methods for their preparation are known in the art. Polyorganosiloxanes in which $R^6$ is a hydrogen atom may be used to prepare polyorganosiloxanes with other functional groups. For example, a silane having an aliphatically unsaturated hydrocarbon group may be reacted with an SiH functional polyorganosiloxane in the presence of a hydrosilylation catalyst to prepare the polyorganosiloxane having the silyl moiety of formula $—R^1—SiR_a(OR)_b$. For example, the alkoxysilane may have formula $R^{13}SiR_a(OR)_b$, where R and subscripts a and b are as described above, and $R^{13}$ is a monovalent aliphatically unsaturated hydrocarbon group, such as alkenyl or alkynyl, as defined herein.

In this embodiment, C) the catalyst may be a Lewis Acid catalyst. Lewis Acid catalysts, such as those containing boron are suitable. For example, the Lewis Acid catalyst may be selected from $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B—CH_2CH_2Si(CH_3)$. Alternatively, starting material C) may be Piers-Rubinsztajn reaction catalyst of formula $B(C_6F_5)_3$, tris(pentafluorophenyl)borane.

This embodiment of the method will produce a graft copolymer comprising units of formulae:

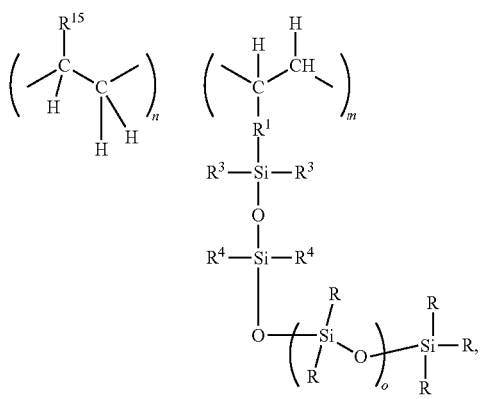

where R, $R^1$, $R^{15}$, m, n, and o are as described above. In this embodiment, each $R^3$ is independently R or OR; and each $R^4$ is independently R, H, OR, or OH or a silyl moiety of formula $-R^1-SiR_a(OR)_b$, where subscript a and subscript b are as described above. A by-product, such as a hydrocarbon, halogenated hydrocarbon, or alcohol may be produced.

This graft copolymer may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

In an alternative embodiment of the method described above, A) the silane grafted polyolefin may be an SiH functional silane grafted polyolefin comprising units of formulae

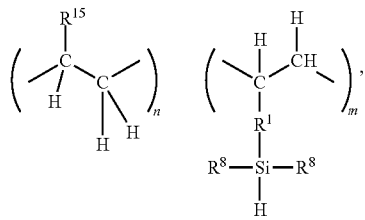

where $R^{15}$, $R^1$, and subscripts m and n are as described above, and each $R^8$ is selected from R (as described above) and H. Examples of such silane grafted polyolefins and methods for their preparation are disclosed, for example, in U.S. Pat. No. 6,624,254.

This silane grafted polyolefin may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

In this embodiment, B) the polyorganosiloxane may have formula

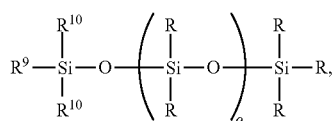

where R is as described above and $R^9$ is selected from OR and OH, and each $R^{10}$ is independently selected from R and $R^9$. Suitable polyorganosiloxanes and methods for their preparation are known in the art. In this embodiment, C) the catalyst may be a Lewis Acid catalyst, and alternatively a Piers-Rubinsztajn reaction catalyst, as described above.

This embodiment of the method produces a graft copolymer comprising units of formulae:

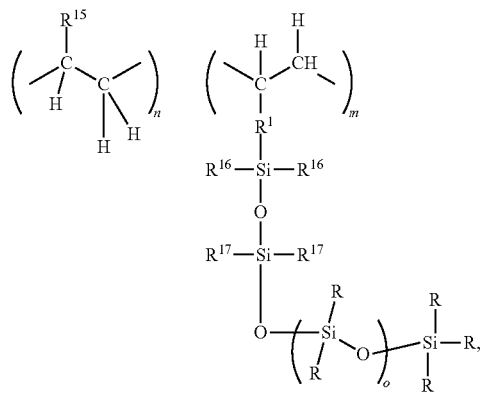

where R, $R^1$, $R^{15}$, m, n and o are as described above, each $R^{16}$ is independently R or H, each $R^{17}$ is independently R, OR, or OH. When $R^9$ is OH, then a by-product such as hydrogen may be produced. When $R^9$ is OR, then a by-product such as a hydrocarbon will be produced.

This graft copolymer may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

In an alternative embodiment of the method described above, A) the silane grafted polyolefin may be the SiH functional silane grafted polyolefin described above comprising units of formulae

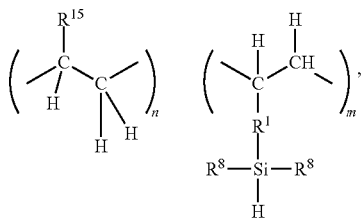

where $R^{15}$, $R^1$, $R^8$, and subscripts m and n are as described above.

In this embodiment, B) the polyorganosiloxane may have formula

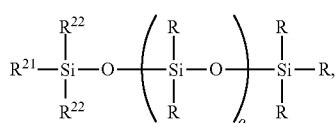

where R is as described above and $R^{21}$ is an epoxy-functional organic group, and each $R^{22}$ is independently selected from R and $R^{21}$. Examples of suitable epoxy-functional organic groups include glycidoxyalkyl groups such as glycidoxypropyl. Suitable polyorganosiloxanes and methods for their preparation are known in the art. In this embodiment, C) the catalyst may be a Lewis Acid catalyst, and alternatively a Piers-Rubinsztajn reaction catalyst, as described above.

This embodiment of the method produces a graft copolymer comprising units of formulae:

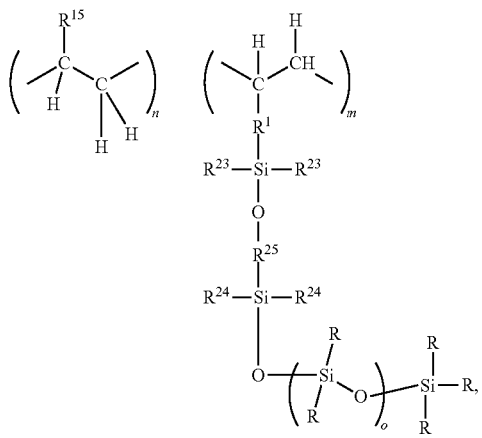

where R, $R^1$, $R^{15}$, m, n and o are as described above, each $R^{23}$ is independently selected from R (as described above) and H, each $R^{24}$ is independently R or an epoxy-functional organic group as described above, and each $R^{25}$ is a divalent organic group, such as a divalent hydrocarbon group or a divalent oxygenated hydrocarbon group. Suitable divalent hydrocarbon groups for $R^{25}$ are as described above for $R^1$. Suitable divalent oxygenated hydrocarbon groups may have formula: or an oxygenated hydrocarbon group of 2 to 50 carbon atoms, such as a group of formula —$(CR_2)_p$—O—$(CR_2)_q$—, where R is as described above, subscript $p \geq 1$, subscript $q \geq 1$ and a quantity (p+q)=2 to 50.

This graft copolymer may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

In an alternative embodiment of the method described above, A) the silane grafted polyolefin may be the SiH functional silane grafted polyolefin described above comprising units of formulae

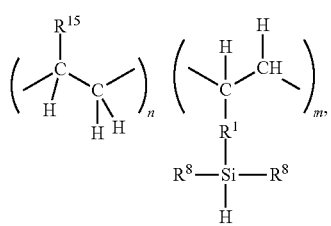

where $R^{15}$, $R^1$, $R^8$, and subscripts m and n are as described above. In this embodiment, B) the polyorganosiloxane has formula

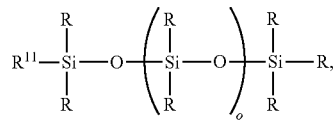

where $R^{11}$ is an aliphatically unsaturated monovalent hydrocarbon group of 2 to 18 carbon atoms. $R^{11}$ may be alkenyl or alkynyl as defined herein. Suitable polyorganosiloxanes and methods for their preparation are known in the art. In this embodiment, starting material C) is a hydrosilylation reaction catalyst. Hydrosilylation reaction catalysts include platinum group metal catalysts, which known in the art and are commercially available. Such hydrosilylation catalysts can be a metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core-shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654.

This embodiment of the method produces a reaction product comprising a graft copolymer comprising units of formulae:

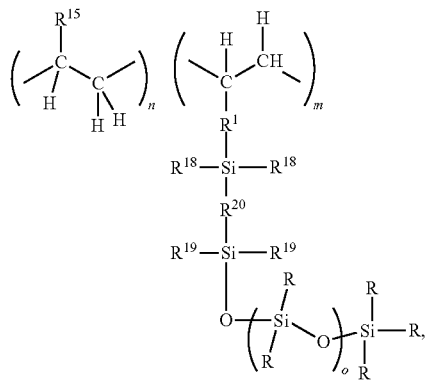

where $R^{15}$, $R^1$, R, m, n, and o are as described above, $R^{20}$ is a divalent hydrocarbon group of 2 to 50 carbon atoms, each $R^{18}$ is independently R or H, and each $R^{19}$ is independently R or $R^{11}$.

This graft copolymer may further comprise $R^{12}$ endblocking groups at each terminus. Each $R^{12}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality).

Starting material D) for each embodiment of the method described above is a solvent. Suitable solvents include hydrocarbon solvents and/or alcohols. Suitable hydrocarbon solvents include alkanes such as hexane and/or heptane; aromatic solvents such as benzene, toluene and/or xylene; and/or cycloalkanes such as cyclohexane. Suitable alcohols include methanol, ethanol, propanol and/or butanol. The amount of solvent is sufficient to compatibilize starting materials A) and B), which may be sufficient to make an optically clear solution of the starting materials used in step 1). The exact amount of solvent will depend on various factors including the selection of starting materials A) and B), however, the amount of solvent may be at least 80%, alternatively 80% to 95%, based on combined weights of all starting materials combined in step 1).

In each embodiment of the method described above, the units in the graft copolymer produced may be randomly distributed in the copolymer. Alternatively, the copolymer may be a block copolymer with the units shown above arranged in blocks.

Without wishing to be bound by theory, it is thought that the methods described herein may provide the benefit that <5% of starting material A) based on the amount of starting material A) added before beginning step 1) and/or <5% of starting material B) based on the amount of starting material B) added before beginning step 1) remains unreacted after step 1). Furthermore, the graft copolymer prepared by the method may have a crystallization temperature at least 20° C. lower than the crystallization temperature of the silane grafted polyolefin used as starting material A), where crystallization temperature is measured by DSC.

EXAMPLES

These examples are intended to illustrate the invention and should not be interpreted as limiting the scope of the invention set forth in the claims.

In Reference Example 1, the following starting materials were used to prepare an alkoxy functional polydimethylsiloxane. A polydimethylsiloxane terminated at one end with a group of formula $Si(CH_3)_2H$ and at the other with $Si(CH_3)_3$ having DP=16, FW=76.74 g/mol Si; and 1260 g/mol SiH was commercially available from Gelest as MCR-H11. Vinylmethyldimethoxysilane having Mw=132.23 g/mol; and bp=106° C. was produced by Dow Corning Corporation and distilled. Toluene was ACS grade from Fischer Scientific. Karstedt's catalyst (having 1480 ppm Pt metal in toluene) was commercially available.

A 250 mL 1 neck round bottom flask was loaded with the following: MCR-H11 (25.00 g, 0.3258 mols Si, 0.01984 mols SiH), toluene (75.00 g), and vinylmethyldimethoxysilane (target: 2.89 g, 0.0219 mols). The contents of the flask were kept under a nitrogen blanket. A water-cooled condenser was attached. A magnetic stir bar was used for mixing. The contents of the flask were heated to 40° C., and the Karstedt's catalyst (0.084 g) was added to the flask. (This amount of Pt catalyst amounted to 5 ppm based on the amount of MCR-H11 added. Heating was continued at 40° C. for 30 minutes. The resulting product was analyzed by IR, which showed some SiH unreacted. The temperature was increased to 75° C. and then held at this temperature for 30 min. The sample was analyzed by IR, which showed no detectable SiH remaining. The product was vacuum stripped on a rotary evaporator at 35° C. and 3 mm Hg. The resulting product was a clear low viscosity fluid at room temperature. This product was analyzed by $^{29}SiNMR$ and found to be a mono $(SiMe(OMe)_2)$ terminated polydimethylsiloxane with a calculated FW=79.88 g/mol Si; and a calculated DP from NMR data=17. This mono $(SiMe(OMe)_2)$ terminated polydimethylsiloxane is designated ingredient b1) in Example 1.

In Example 1, the following starting materials were used to make a graft copolymer. Starting material a1) was an SiH functional polyethylene-octene copolymer with 3.2 wt % octenyldimethylsilane grafted on the polyethylene-octene having Mn=17,170; Mw=40,860; Tg (−60.9° C.); Tm (86.5° C.) and SiH equivalent wt=5,325 g/mol SiH. Starting material d1) was ACS Grade toluene was available from Fischer Scientific. Starting material c1) was a Piers-Rubinsztajn reaction catalyst of formula $B(C_6F_5)_3$ with Mw=511.98, delivered at 5 wt % in toluene. An endcapper, trimethylmethoxysilane having Mw=104.22 and bp=57-58° C., was also used.

The graft copolymer was prepared and as follows. A 100 mL round bottom flask was loaded with: 6.0 g of starting material a1) and 34.0 g of toluene. This resulted in a 15% NVC solution. The flask was equipped with a magnetic stir bar and a nitrogen blanket was applied. The mixture in the flask was heated by exposing the flask to an aluminum block at a block temperature=85° C.

After dissolving starting material a1) in the toluene, starting material b1) in an amount of 1.26 g (corresponding to 0.000905 mols $SiMe(OMe)_2$ functionality) was added to the flask. A total of 0.036 g of starting material c1) was added to the flask. After 1 min a small amount of foaming occurred, likely evidence of gas formation. The solution in the flask was heated at 85° C. for 1 hour. Endcapper trimethylmethoxysilane (0.23 g, 0.0022 mol) was then added to the flask, and heating was continued at 85° C. for 20 min. The flask contents were analyzed by IR analysis, which showed unreacted SiH remaining. Additional trimethylmethoxysilane (0.23 g, 0.0022 mol) was added to the flask. The contents were heated at 60° C. for 1 hour. The sample was analyzed by IR, which showed SiH still remaining. Additional c1) catalyst (another 0.036 g) was added to the flask such that the flask contents contained 500 ppm of $B(C_6F_5)_3$. Heating was continued at 60° C. for 1 hour, and IR analysis showed no SiH remaining. The reaction mixture was poured onto a Teflon film and dried at room temperature overnight. The resulting product was an opaque, elastomeric film with good strength.

In example 2, the following starting materials were used to prepare a graft copolymer by reacting b2) a mono-SiH terminated polydimethylsiloxane (PDMS) with a2) a methoxy (SiOMe) grafted low density polyethylene. The following starting materials were used. Starting material a2) was a low density polyethylene grafted with silicon bonded methoxy groups, which is commercially available as SI-LINK-DFDA-5451 NT from The Dow Chemical Company of Midland Mich., U.S.A. with a calculated Mn=20,000 g/mol and 1.5% to 2.0% vinyltrimethoxysilane incorporated. Starting material b2) was a polydimethylsiloxane having DP=16, which was mono-SiH terminated had FW=76.74 g/mol Si and contained 1260 g/mol SiH, and was commercially available as MCR-H11 from Gelest. Starting material c2) was $B(C_6F_5)_3$ delivered 5 wt % in toluene. Starting material d2) was ACS grade toluene, commercially available from Fisher Scientific. An endcapper, triethylsilane having Mw=116.28 and bp=107-108° C. was commercially available from Acros Organics.

The graft copolymer was prepared as follows: a 250 mL wide-mouth borosilicate glass bottle was loaded with: 20.0 g of a2) the low density polyethylene grafted with silicon bonded methoxy groups described above, 2.55 g of b2) the polydimethylsiloxane described above, and 90.21 g of d2) the toluene to prepare a 20% NVC solution. The bottle was equipped with a Teflon stir paddle attached to a glass stir shaft. A nitrogen purge was applied. The solution in the bottle was heated using an oil bath at an oil temperature of 110° C. The solution was clear once all of a2) the low density polyethylene dissolved.

An amount of 0.11 g of c2) the catalyst was added to the bottle (which corresponds to 250 ppm of $B(C_6F_5)_3$ based on solids (i.e., combined amounts of a2) polyethylene and b2) polydimethylsiloxane). Within seconds of addition, the contents of the bottle formed a foam, which is an indication of gas formation (methane). Heating was continued at 110° C. for 30 minutes.

An amount of 0.94 g triethylsilane was then added to the bottle. The triethylsilane was added after incorporation of b) the polydimethylsiloxane to stabilize the resulting graft copolymer by endcapping any residual SiOMe groups which are sterically accessible to groups of formula (Si—O—SiEt$_3$). Heating was continued at 110° C. for 1 hour.

The bottle contents were poured onto a Teflon sheet while still hot in a fume hood. IR analysis of a hot pressed film formed from the bottle contents showed no detectable SiH. The hot pressed film was smooth, flexible, tough, and translucent.

In this example 3, a graft copolymer was prepared by a method comprising reacting a b3) monoepoxy-terminated siloxane with a3) an SiH grafted polyolefin. The following starting materials were used. Starting material a3) was a polyethylene-octene copolymer having silicon bonded hydrogen atoms, which was prepared with 3.2% of a silane monomer, ODMS. The polyethylene-octene copolymer had Mn=17,170; Mw=40,860; Tg (−60.9° C.); Tm (86.5° C.); and SiH equivalent wt=5,325 g/mol SiH. Starting material d3) was toluene purified via solvent purification system. Starting material b3) was a mono(2,3-Epoxy)propylether terminated polydimethylsiloxane, which was commercially available from Gelest as MCR-E21 and had Mw=5000 g/mol. Starting material c3), the catalyst, was $B(C_6F_5)_3$ in a 10 mg/mL solution in toluene. Starting material d3') was HPLC grade methanol, which was commercially available from Fisher.

The graft copolymer was prepared as follows. In a glove box, a 2 dram vial was loaded with 50 mg of starting material a3) the SiH grafted polyolefin, 47 mg of b3), the epoxy-terminated PDMS, 1 mL of toluene, and a Teflon stirbar. This reaction mixture was heated using a heating block at 100° C. until it became translucent. Starting material c3) in an amount of 5 uL of a 10 mg/mL solution in toluene was added, and heating at 100° C. was continued for 18 hours. The vial was then removed from the glovebox and the graft copolymer was precipitated into rapidly stirring methanol, and isolated by filtration and drying on high vacuum (100 mTorr) overnight.

Results analyzed by $^1$H NMR spectrum showed complete consumption of peaks associated with the epoxide moiety on starting material b3). Preliminary GPC results gave a Mn of 23 kiloDaltons, which is consistent with 1 polydimethylsiloxane from b3) per polyolefin chain from a3), however, under the GPC conditions used, starting material b3) exhibited a Mw of 1900 g/mol. Therefore the GPC results may be consistent with quantitative functionalization.

In this example 4, a graft copolymer was prepared by a method comprising reacting b4) a vinylpentamethyldisiloxane with a4) a SiH grafted polyolefin. The following starting materials were used. Starting material a4) was a SiH functional polyethylene-octene copolymer prepared with 3.2% silane monomer (ODMS); Mn=17,170; Mw=40,860; Tg (−60.9° C.); Tm (86.5° C.); and SiH equivalent wt=5,325 g/mol SiH. Toluene was purified via a solvent purification system. Starting material b4) was vinylpentamethyldisiloxane available from Gelest. Starting material c4) was Karstedt's catalyst delivered at 2% in xylene and having Mw=174 g/mol. Methanol, HPLC grade, was available from Fisher.

The graft copolymer was prepared as follows. In a glove box, a 2 dram vial was loaded with 50 mg of a4) the SiH grafted polyolefin described above, 4.9 mg of b4) pentamethyldisiloxane, 1 mL of toluene, and a Teflon stirbar. This reaction mixture was heated using a heating block at 100° C. until the reaction mixture became translucent. Starting material c4), Karstedt's catalyst (10 uL of a 0.2 wt % solution in toluene) was then added to the vial, and the heating was continued at 100° C. for 2.5 hours. The vial was then removed from the glovebox and the graft copolymer was precipitated into rapidly stirring methanol. The graft copolymer was then isolated by filtration and dried on high vacuum (100 mTorr) overnight.

Results analyzed by $^1$H NMR showed 96% conversion by integration of Si—H peak (4 ppm) vs total aliphatic protons (2448 total) and 2.8 disiloxane units per chain by integration of Si-Me peaks. GPC showed a qualitative increase in $M_n$ to 20,505 g/mol.

In this example 5, a 100 mL round bottom flask (with magnetic stir bar) was loaded with 4.46 g of mono-vinyl terminated polydimethylsiloxane having a DP of 94 and 0.660 mmol vinyl content, 0.5 g of a poly(ethylene-octene) copolymer having pendant SiH functionality, in an amount of 0.660 mmol SiH, and 28.11 g toluene. The resulting mixture was heated using an aluminum block at a temperature of 105° C. A catalyst solution containing 924 ppm Pt (0.054 g of solution) was added. This amounted to 10 ppm Pt based on solids in the mixture. The mixture was heated at 105° C. for a total of 37 hours. Most of the SiH was consumed within the first 12 hours. The resulting product was stripped to dryness using a rotary evaporator at an oil bath temperature of 120° C. and pressure of 1 to 2 mm Hg. The flask was left on the rotary evaporator for 30 minutes after the bulk of the solvent was removed. The resulting product was a high viscosity liquid at 120° C. with just a very light haze. This product at room temperature was gel-like with a light haze.

A TA Instruments Q2000 differential scanning calorimeter with a liquid nitrogen cooling system was used to measure the crystallization temperature (Tcryst). A sample of 10 mg was introduced in a TA Instruments aluminum pan punctured (open helium environment) to create an inert environment. Indium was used as a calibration standard for heat flow and temperature. Samples were cooled from 250° C. at 20° C./min to −170° C. using helium as a purge gas (25 mL/min). Tcryst was taken from the peak in the exotherm upon cooling.

Results for the starting material poly(ethylene-octene) copolymer having pendant SiH functionality (SiH Pendant Polyethylene) and the resulting graft copolymer (PE-Graft-PDMS copolymer) are shown below in Table 1.

TABLE 1

| Sample | Tcryst, ° C. |
| --- | --- |
| SiH Pendant Polyethylene (Starting Material) | 97.1 |
| PE-Graft-PDMS copolymer (Product) | 64.7 |

These results confirm the large reduction (over 30° C.) in crystallization temperature of the polyolefin upon introduction of polyorganosiloxane side chains in this example 5.

INDUSTRIAL APPLICABILITY

The graft copolymers described herein may provide multiple benefits, e.g., from the olefin adding semi-crystallinity, solvent resistance, toughness (e.g. strain hardening), melt processability/strength, and/or low cost; with the siloxane adding environmental and thermal stability, permeability, soft touch, polar functionality and/or low temperature capability. The methods for preparing the graft copolymers described herein may have the advantage (over graft copolymers having polyorganosiloxane backbones with polyolefin pendant groups) of allowing for the lengths of both the polyolefin and polyorganosiloxane components to be kept constant while changing the amount of each component independently. Without wishing to be bound by theory, it is thought that this enables better control over mechanical properties and resulting performance of the graft copolymer in different applications. Furthermore, graft or comb copolymers with multiple junction points (as opposed to two in an ABA polymer architecture) may also lead to better load distribution, increasing mechanical strength. Without wishing to be bound by theory, it is believed that the junction points (i.e., where the siloxane pendant groups bond to the polyolefin main chains) act like mechanical reinforcing sites. A graft copolymer where the semi-crystalline hard blocks constitute the main chain and the siloxane soft blocks are pendent can also pack easily into lamellar morphologies, which are of interest for barrier properties and optical applications.

Structures of the graft copolymer described herein (where the backbone is a rigid, semi-crystalline polyolefin and the pendant groups are polysiloxane flexible grafts may provide one or more of the following application advantages. Thermoplastic elastomers where the hard block is typically the minority component are most effectively generated through a main chain hard block architecture since it most closely mimics the well-established ABA conformation. These materials may be useful as reinforced silicone elastomers where the semi-crystalline polyolefin phase serves as the reinforcement. And, the surface activity of the polyorganosiloxane pendant groups and the ease with which they present themselves at the air interface is expected to be beneficial for reducing the coefficient of friction when the graft copolymer is added as an additive to polyolefin homopolymers. Furthermore, the methods for preparing the graft copolymers described herein may avoid degradation of the polyolefin backbone that can occur when radical reaction is used to prepare a polyolefin polyorganosiloxane copolymer.

Without wishing to be bound by theory, it is thought that the graft copolymer described herein may be used neat as a thermoplastic elastomer or as a compatibilizer in compositions containing both a polyolefin and a polyorganosiloxane.

DEFINITIONS AND USAGE OF TERMS

The Brief Summary of the Invention and the Abstract are hereby incorporated by reference. All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, and an aryl group includes the member alkyl individually; the subgroup alkyl and aryl; and any other individual member and subgroup subsumed therein.

"Alkyl" refers to a cyclic or linear, branched or unbranched, saturated monovalent hydrocarbon group. Alkyl is exemplified by, but not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl; and hexyl, heptyl, octyl, nonyl, and decyl, as well as other cyclic or branched saturated monovalent hydrocarbon groups with 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Alkenyl" means a branched, or unbranched unsaturated monovalent hydrocarbon group, where the monovalent hydrocarbon group has a double bond. Alkenyl groups include vinyl, ethenyl, allyl, and hexenyl, and branched isomers thereof. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched unsaturated monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom, and may optionally have pendant hydrocarbon groups. Aryl is exemplified by, but not limited to, phenyl, naphthyl, benzyl, tolyl, xylyl, phenylethyl, phenyl propyl, and phenyl butyl. Aryl groups have at least 5 carbon atoms. Monocyclic aryl groups may have 5 to 12 carbon atoms, alternatively 6 to 9 carbon atoms, and alternatively 6 to 8 carbon atoms. Polycyclic aryl groups may have 7 to 17 carbon atoms, alternatively 7 to 14 carbon atoms, and alternatively 9 to 12 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene, cyclohexene or norbornadiene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl.

Abbreviations used herein are as defined in Table 2.

TABLE 2

| Abbreviation | Meaning |
| --- | --- |
| bp | Boiling point |
| DP | Degree of polymerization |
| DSC | Differential scanning calorimetry |

TABLE 2-continued

| Abbreviation | Meaning |
| --- | --- |
| Et | ethyl |
| FW | Formula weight |
| GPC | Gel permeation chromatography |
| IR | Infra-red |
| Pa · s | Pascal seconds |
| Me | methyl |
| mg | milligram |
| Mn | Number average molecular weight |
| Mw | Weight average molecular weight |
| NMR | Nuclear magnetic resonance |
| NVC | Nonvolatile content |
| ODMS | octenyldimethylsilane |
| PDMS | Polydimethylsiloxane |
| Tg | Glass transition temperature calculated from the half extrapolated tangents method |
| Tm | Melting temperature |
| uL | microliter |

The invention claimed is:

1. A method for preparing a copolymer comprising:
1) combining starting materials comprising
A) a silane grafted polyolefin comprising units of formulae

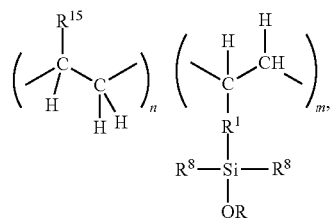

where each R is independently selected from a monovalent hydrocarbon group of 1 to 18 carbon atoms or a monovalent halogenated hydrocarbon group of 1 to 18 carbon atoms, each $R^1$ is independently a divalent hydrocarbon group of 2 to 50 carbon atoms, each $R^5$ is independently selected from R or OR, and each $R^{15}$ is independently H, a monovalent hydrocarbon group of 1 to 18 carbon atoms or a monovalent halogenated hydrocarbon group of 1 to 18 carbon atoms, subscript m≥1, and subscript n≥1;

B) a polyorganosiloxane of formula

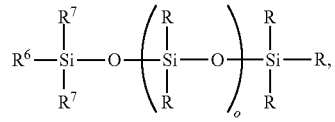

where $R^6$ is H; and each $R^7$ is independently selected from R and $R^6$;

C) a Lewis acid catalyst; and

D) a solvent; thereby preparing a reaction product comprising a graft copolymer.

2. The method of claim 1, where the graft copolymer comprises units of formulae:

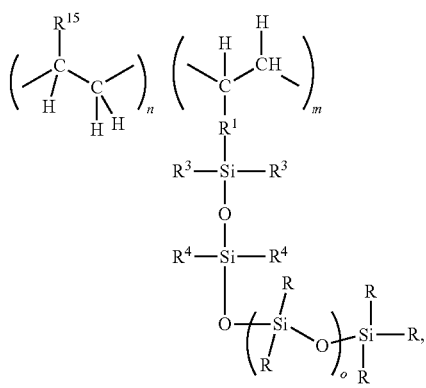

where each $R^3$ is independently R or OR, each $R^4$ is independently R, H, OR, or OH or the silyl moiety of formula $-R^1-SiR_a(OR)_b$; and subscript o is 5 to 500.

3. A method for preparing a copolymer comprising:
1) combining starting materials comprising
A) a silane grafted polyolefin silane grafted polyolefin comprising units of formulae

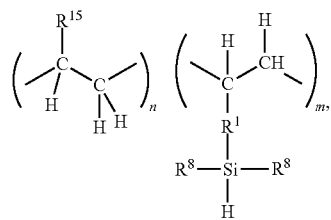

where each R is independently selected from a monovalent hydrocarbon group of 1 to 18 carbon atoms or a monovalent halogenated hydrocarbon group of 1 to 18 carbon atoms, each $R^1$ is independently a divalent hydrocarbon group of 2 to 50 carbon atoms, each $R^8$ is selected from R and H, subscript m≥1, and subscript n≥1;
B) a polyorganosiloxane formula

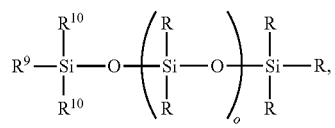

where $R^9$ is selected from OR or OH, and each $R^{10}$ is independently selected from R and $R^9$ and subscript o is 5 to 500;
C) a Lewis acid catalyst; and
D) a solvent.

4. The method of claim 3, where the graft copolymer comprises units of formulae:

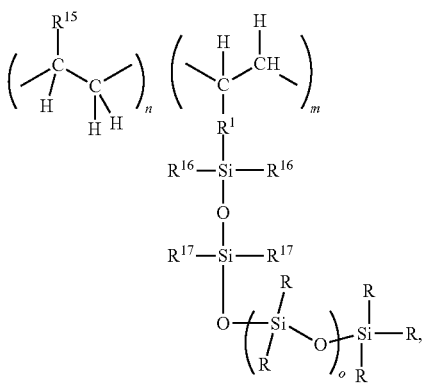

where each $R^{16}$ is independently R or H, each $R^{17}$ is independently R, OR, or OH, and subscript o is 5 to 500.

5. The method of claim 1, where C) the Lewis Acid catalyst is selected from $C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B-CH_2CH_2Si(CH_3)$.

6. The method of claim 5, is tris(pentafluorophenyl) borane.

7. The method of claim 1, where subscript m is 1 to 10 and 0.01 mole %<m/(m+n)<10 mol %.

8. The method of claim 1, where each R is independently selected from an alkyl group, an alkenyl group, or an aryl group.

9. The method of claim 1, where each $R^{15}$ is a hydrogen atom.

10. The method of claim 1, where the silane grafted polyolefin and the copolymer further comprises an endblocking group at each terminus, where each endblocking group may independently be a saturated monovalent hydrocarbon group or an unsaturated monovalent hydrocarbon group having one or more double bonds.

11. The method of claim 1, further comprising forming A) the silane-grafted polyolefin by a method comprising grafting a silane moiety onto a polyolefin by metallocene catalysis before step 1).

12. The method of claim 1, further comprising: recovering the graft copolymer from the reaction product.

13. The method of claim 1, further comprising using the copolymer as a compatibilizer in a composition comprising a polyolefin and a polyorganosiloxane.

* * * * *